Nov. 10, 1925.  1,560,939

B. McPHILLIAMY

SAFETY APPLIANCE FOR VEHICLE WHEELS

Filed Nov. 13, 1923

INVENTOR
Burton McPhilliamy
by W. B. Doolittle
his attorney

Patented Nov. 10, 1925.

1,560,939

UNITED STATES PATENT OFFICE.

BURTON McPHILLIAMY, OF VANDERGRIFT, PENNSYLVANIA.

SAFETY APPLIANCE FOR VEHICLE WHEELS.

Application filed November 13, 1923. Serial No. 674,508.

*To all whom it may concern:*

Be it known that I, BURTON MCPHIL-LIAMY, a citizen of the United States, residing at Vandergrift, in the county of Westmoreland and State of Pennsylvania, have invented certain new and useful Improvements in Safety Appliances for Vehicle Wheels, of which the following is a specification.

This invention is for a safety connection between a wheel hub and spindle.

The invention relates to an improvement of the hub and spindle connection shown in my Patent No. 1,374,597 of April 12, 1921, and has for its object to provide an improved and more efficient construction, designed to prevent the wheel from becoming detached in the event the spindle breaks. The invention is particularly applicable to front wheels of automobiles.

My invention may be readily understood by reference to the accompanying drawings, which illustrate my invention and in which.

Figure 1:
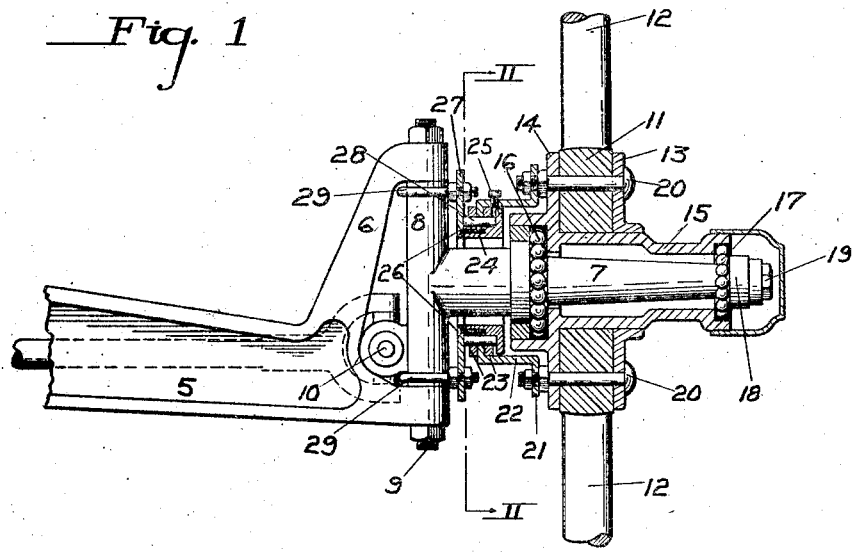
Fig. 1 is a view partly in elevation and partly in section of a front hub and spindle assembly embodying my improvement.
Figure 2:
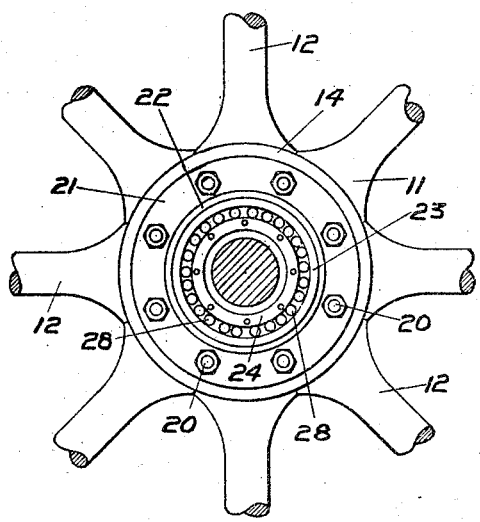
Fig. 2 is a section in the plane of line II—II of Fig. 1.

In the drawings, 5 designates the front axle of an automobile, 6 is the yoke at the end thereof, and 7 is the spindle having a vertical post 8 through which a bolt 9 passes, said bolt also passing through the arms of the yoke in the usual manner, to pivotally support the spindle. Steering connections are indicated at 10.

Mounted on the spindle is a wheel, only the hub portion 11 of which is shown in the drawings. The wheel is of usual construction, comprising a series of radial spokes 12 clamped and bolted between outer and inner plates 13 and 14, respectively, the inner plate having a central sleeve portion 15 which supports the wheels on ball bearings at 16 and 17. At 18 is a collar or flange, and at 19 is a nut for holding the wheel on the spindle.

Some of the bolts 20 which clamp plates 13 and 14 together are longer than others, so that they may extend through a flange 21 on a supporting member 22 which has a central opening in the inner end thereof. The metal around the edge of the central opening is thickened or otherwise reinforced, as by welding on rings of metal, as indicated at 23. This provides a relatively wide bearing surface.

Passed through the opening in the supporting member 22 is bushing member 24 having a flanged outer edge 25. Removably secured to the bushing by means of screws or bolts 26 is a plate 27. An annular channel is thus formed on the exterior of the bushing between flange 25 and plate 27. Roller bearings 28 are put in this channel to provide an anti-friction bearing for the supporting member 22, the edges of whose central opening engage these roller bearings, as shown.

Passing through the outer part of plate 27 near the top and bottom thereof are the ends of U-bolts 29 which are clamped around the spindle post 8, thereby firmly securing plate 27 and bushing 24 to the post. By reason of the channel-like form of the periphery of the bushing, member 22 bolted to the hub may not move laterally—but may revolve about the bushing on the roller bearings.

The member 22 may be applied to the wheel before the wheel is put in place, and after the bushing 24 has been inserted through the opening in member 22, roller bearings 28 may then be inserted, and plate 27 secured in place, and the wheel with the safety attachment can be applied to the spindle as a unit. When the wheel is in place, U-bolts 29 are applied, and the nuts taken up to the necessary extent. Thus, the device is extremely simple and may be made sufficiently strong. In the event that the spindle breaks, the device will serve to prevent the wheel from becoming detached and temporarily support the wheel in place.

Figure 3:
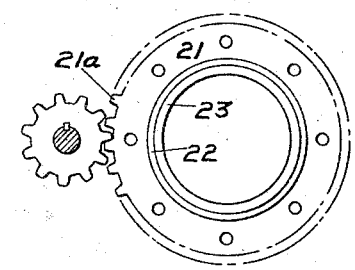
Fig. 3 is a front elevational view of a part of my invention.

One of the supporting members 22 (assuming that the invention is applied to the two front wheels) may have teeth 21$^a$ provided on the periphery of its flange 21 to provide a speedometer gear, as indicated in Fig. 3. This is important in that when the invention is applied to the usual spindle, there is no room left for the ordinary speedometer gear.

Various detail changes may be made in the construction and arrangement of parts within the contemplation of my invention and under the scope of the appended claims.

I claim as my invention:

1. The combination with a wheel hub and spindle assembly, of a centrally apertured member secured to the hub, a bushing passed through the aperture of said member and secured to a part of the spindle assembly, means extending into the aperture of said member providing an anti-friction bearing between said member and bushing, and means on the bushing for limiting the lateral movement of said apertured member relatively thereto.

2. The combination with a wheel hub and spindle assembly, of a centrally apertured member secured to the hub, and means on the spindle assembly received in the central aperture of said member and providing an anti-friction bearing therefor.

3. The combination with a wheel hub, of a spindle, a post at one end of the spindle, a supporting member having a central aperture secured to the inner face of the hub, a bushing having a flange on its outer face passing through the opening in the supporting member, a plate removably secured to the inner end of the bushing adjacent said post, and means for securing said plate to the post.

4. The combination with a wheel hub, of a spindle, a post at one end of the spindle, a supporting member having a central aperture secured to the inner face of the hub, a bushing having a flange on its outer face passing through the opening in the supporting member, a plate removably secured to the inner end of the bushing adjacent said post, an annular channel being thus formed on the bushing between the flange and plate into which the edge of the opening of the supporting member extends, means in the channel providing an anti-friction bearing for said edge, and means for securing said plate to the post.

In testimony whereof I affix my signature.

BURTON McPHILLIAMY.